United States Patent [19]
Couch et al.

[11] 4,201,884
[45] May 6, 1980

[54] DIGITAL DATA TRANSMISSION SYSTEM

[75] Inventors: Philip R. Couch, Roanoke, Va.; David A. Philpott, Leeds, England

[73] Assignee: International Standard Electric Corporation, New York, N.Y.

[21] Appl. No.: 848,964

[22] Filed: Nov. 7, 1977

[30] Foreign Application Priority Data

Nov. 16, 1976 [GB] United Kingdom ............... 47673/76

[51] Int. Cl.² .......................................... H04L 27/18
[52] U.S. Cl. ..................................... 375/53; 375/67; 375/86
[58] Field of Search ............... 325/30, 163, 38 A, 320; 178/67, 68; 340/170; 179/58 R, 58 A; 331/45; 332/9 R

[56] References Cited

U.S. PATENT DOCUMENTS

| | | | |
|---|---|---|---|
| 3,553,368 | 1/1971 | Rudolph | 178/67 |
| 3,622,983 | 11/1971 | Deregnaucourt | 325/38 A |
| 3,983,485 | 9/1976 | Stuart | 178/67 |
| 4,006,416 | 2/1977 | Pastan et al. | 325/30 |

*Primary Examiner*—Benedict V. Safourek
*Attorney, Agent, or Firm*—John T. O'Halloran; Alfred C. Hill

[57] ABSTRACT

The position of a pulse, relative to a reference time, defines a digital data state. The position alternates about the reference time such that by monitoring the mean pulse position the reference time may be regenerated in the receiver. The reference time is then used to decode the transmitted signal.

6 Claims, 2 Drawing Figures

DIGITAL DATA TRANSMISSION SYSTEM

BACKGROUND OF THE INVENTION

The present invention relates to a transmission system and more particularly to a digital data transmission system.

SUMMARY OF THE INVENTION

An object of the present invention is to provide a digital data transmission system using pulse position modulation.

A feature of the present invention is the provision of a digital data transmission system comprising: a transmitter including first means for producing a polyphase clock, and logic gating means coupled to the first means for gating digital data input signals with the polyphase clock, one data state of the input signals being gated with one clock phase of the polyphase clock and the other data state of the input signals being alternately gated with other clock phases of the polyphase clock, the other clock phases being equally distributed in time about a mean pulse position of the system; and a receiver including second means coupled to the logic gating means for extracting from signals received from the transmitter a reference clock signal corresponding to the one clock phase, and third means coupled to the second means for sampling the received signal with the extracted reference clock signal.

Another feature of the present invention is the provision of a digital data transmitter comprising: means for producing a polyphase clock, and logic gating means coupled to the means for gating digital data input signals with the polyphase clock, one data state of the input signals being gated with one clock phase of the polyphase clock and the other data state of the input signals being alternately gated with other clock phases of the polyphase clock, the other clock phases being equally distributed in time about a mean pulse position of the system.

A further feature of the present invention is the provision of a digital data receiver receiving a signal having one data state of a digital data signal being represented by one clock phase of a polyphase clock and the other data state of the digital data signal being alternately represented by other clock phases of the polyphase clock, the other clock phases being equally distributed in time about a mean pulse position of a digital data transmission system, comprising: first means for extracting from the received signal a reference clock signal corresponding to the one clock phase; and second means coupled to the first means for sampling the received signal with the extracted reference clock signal.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

The system being described utilizes a means of coding data for transmission being a variation on pulse position modulation. The position of a pulse, relative to a reference time, defines a data state. The position alternates about the reference time such that by monitoring the mean pulse position the reference time may be regenerated in the receiver. The reference time is then used to decode the transmitted signal. The code finds particular application where a low duty cycle in the transmission medium is desirable, e.g. in a fibre optic communication system using pulsed laser sources. By way of example to explain how to implement the code a trivial case, coding of binary data, will be outlined.

The binary states must be defined, e.g. logic state "1" may be spaced zero distance from the reference time and logic state "0" may be spaced an arbitrary interval, "t", from the reference time. For alternate occurrences of the "0" the pulse is spaced "t" before, or "t" after the reference time. (The spacing of the "1" pulse from the reference time, being zero, will not alternate).

Figure 1:
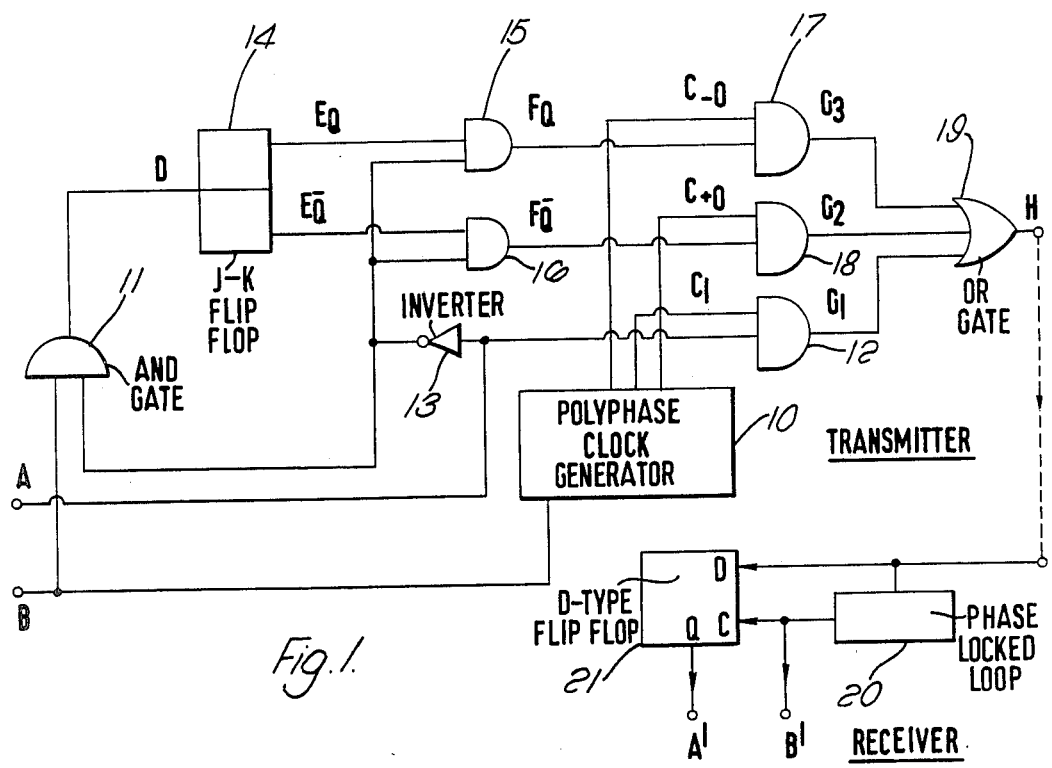
FIG. 1 illustrates a block diagram of a digital data transmission system according to the principles of the present invention.

In the arrangement shown in FIG. 1 an input clock B, associated with a binary non-return-to-zero (NRZ) input signal A, drives a polyphase clock generator 10 which is required to produce, in the present case a main or reference clock $C_1$ in phase with the input clock and two subsidiary phases—one ($C_{-0}$) shortly before the reference phase and one ($C_{+0}$) an equal time after the reference phase. The input clock B is also fed to an AND gate 11. The input binary signal A is fed directly to an AND gate 12 together with the reference clock $C_1$, the polarities of the signals being such that gate 12 is opened when an input logic state "1" occurs. The binary input A is also fed via an inverter 13 to gate 11. Thus when the input logic state "0" occurs gate 11 opens and allows a clocking pulse D to be applied to a divide-by-two circuit 14. This circuit is conveniently realized by a bistable device commonly referred to as a J-K flip flop with permanently enabled "set" inputs. Thus successive "0" logic states in the input will cause the Q and $\bar{Q}$ outputs of circuit 14 to produce outputs $E_Q$, $E_{\bar{Q}}$ alternately, and these are fed to gates 15 and 16 respectively together with the inverted binary signal from inverter 13. The output $F_Q$ from gate 15 is applied, together with the polyphase clock output $C_{-0}$, to AND gate 17. The output $F_{\bar{Q}}$ from AND gate 16, together with the polyphase clock output $C_{+0}$, is applied to AND gate 18. Thus, while input logic states "1" are gated with the reference clock phase the "0" states are gated with what may be termed the "early" and "late" clock phases alternately. The three outputs $G_1$, $G_2$ and $G_3$ of AND gates 12, 17 and 18 are then combined via OR gate 19 resulting in waveform H of FIG. 2 for feeding to a transmission line or other transmission mediums.

Figure 2:
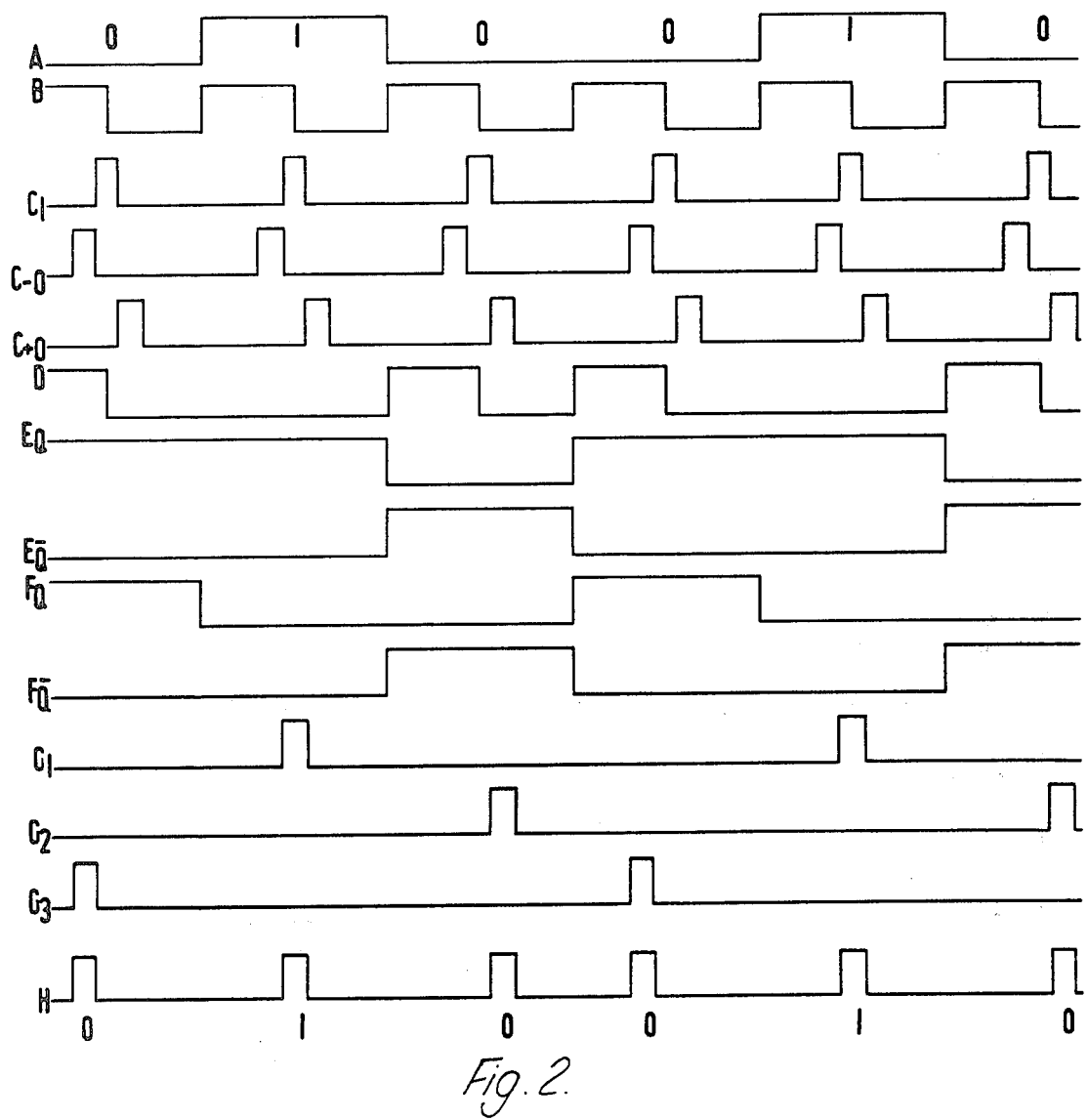
FIG. 2 illustrates various lettered waveforms associated with the system of FIG. 1 with the location of the waves being indicated in FIG. 1 by a corresponding letter.

To decode signal H of FIG. 2 at the receiver the mean position of the pulses must first be extracted, thus providing the reference clock phase. This can be accomplished by the use of techniques well known in the art. By sampling the received signals with the reference clock phase pulses coincident with the reference time (i.e. the pulses corresponding to the "1" logic state) will be detected. Any other pulses will be ignored. Hence the receiver output need only show a "1" for a detected pulse and a "0" for no pulse.

In the receiver shown in FIG. 1 the received signals are applied to a phase locked loop 20 to extract the reference clock $B^1$. This clock is then applied to the clock input C of a bistable device 21 of the type commonly referred to as a D-type flip-flop. The received signals are applied to the D input of the bistable device 21. The Q output of the bistable provides the decoded binary signals $A^1$.

The invention is not limited to coding binary signals but may, by logical extensions, be utilized for multi-level digital signals and also analog signals, where the number of subsidiary phases on either side of the reference phase is increased. The coding technique always includes timing (clock) information and may encode any sequences of data while retaining a substantially zero disparity in the cumulative line signals. Further advantages may be realized when the invention is used in fibre-optic communication systems where the best use must be made of a limited duty cycle pulse laser and where the use of avalanche photodiodes is simplified by using constant duty cycle signals.

While we have described above the principles of our invention in connection with specific apparatus it is to be clearly understood that this description is made only by way of example and not as a limitation to the scope of our invention as set forth in the objects thereof and in the accompanying claims.

We claim:

1. A digital data transmission system comprising:
   a transmitter including
   first means for producing a polyphase clock, and
   logic gating means coupled to said first means for gating digital data input signals with said polyphase clock to provide a transmission signal, one data state of said input signals being gated with one clock phase of said polyphase clock, said one clock being time coincident with a reference time, and the other data state of said input signals being alternately gated with other clock phases of said polyphase clock, said other clock phases being equally distributed in time about said reference time; and
   a receiver including
   second means coupled to said logic gating means for extracting from signals received from said transmitter a reference clock signal corresponding to said one clock phase, and
   third means coupled to said second means for sampling said received signal with said extracted reference clock signal.

2. A system according to claim 1, wherein
   the number of phases in said polyphase clock is three, and
   said digital data input signals are binary coded signals.

3. A digital data transmitter comprising:
   means for producing a polyphase clock, and
   logic gating means coupled to said means for producing for gating digital data input signals with said polyphase clock to provide a transmission signal, one data state of said input signals being gated with one clock phase of said polyphase clock, said one clock phase being time coincident with a reference time, and the other data state of said input signals being alternately gated with other clock phases of said polyphase clock, said other clock phases being equally distributed in time about said reference time.

4. A transmitter according to claim 3, wherein
   the number of phases in said polyphase clock is three, and
   said digital data input signals are binary coded signals.

5. A digital data receiver receiving a signal having one data state of a digital data signal being represented by one clock phase of a polyphase clock, said one clock phase being time coincident with a reference time, and the other data state of said digital data signal being alternately represented by other clock phases of said polyphase clock, said other clock phases being equally distributed in time about said reference time, comprising:
   first means for extracting from said received signal a reference clock signal corresponding to said one clock phase; and
   second means coupled to said first means for sampling said received signal with said extracted reference clock signal.

6. A receiver according to claim 5, wherein
   the number of phases of said polyphase clock is three, and
   said digital data signal is a binary coded signal.

* * * * *